United States Patent
Yuasa (10) Patent No.: US 10,634,767 B2
(45) Date of Patent: Apr. 28, 2020

(54) ELECTRONIC DISTANCE MEASURING INSTRUMENT

(71) Applicant: TOPCON Corporation, Tokyo-to (JP)

(72) Inventor: Taichi Yuasa, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 423 days.

(21) Appl. No.: 15/378,568

(22) Filed: Dec. 14, 2016

(65) Prior Publication Data

US 2017/0168141 A1 Jun. 15, 2017

(30) Foreign Application Priority Data

Dec. 15, 2015 (JP) ................................ 2015-244063

(51) Int. Cl.
*G01S 7/481* (2006.01)
*G01S 17/42* (2006.01)
(Continued)

(52) U.S. Cl.
CPC ........... *G01S 7/4811* (2013.01); *G01S 7/4812* (2013.01); *G01S 7/4817* (2013.01); *G01S 17/08* (2013.01); *G01S 17/42* (2013.01); *G01S 17/66* (2013.01)

(58) Field of Classification Search
CPC .... G01S 7/4811; G01S 7/4812; G01S 7/4816; G01S 7/4817
See application file for complete search history.

(56) References Cited

U.S. PATENT DOCUMENTS 3,598,491 A * 8/1971 Hess ...................... G01S 7/4811
356/4.01
5,648,852 A * 7/1997 Kato ...................... G01S 7/4812
356/5.01
(Continued)

FOREIGN PATENT DOCUMENTS

GB 2235789 A 3/1991
JP 8-122427 A 5/1996
(Continued)

OTHER PUBLICATIONS

European communication dated Nov. 20, 2017 in corresponding European patent application No. 16203237.9.
(Continued)

*Primary Examiner* — Eric L Bolda
(74) *Attorney, Agent, or Firm* — Nields, Lemack & Frame, LLC (57) ABSTRACT

The invention provides an electronic distance measuring instrument, which comprises a light projecting optical system for emitting a distance measuring light onto a distance measuring optical axis and a light receiving optical system for leading a reflected distance measuring light to a photodetector, wherein the light projecting optical system has a projection optical axis deflecting unit for deflecting a projection optical axis so that the projection optical axis coincides with a light receiving optical axis, the light receiving optical system has a first light receiving optical axis deflecting unit and a second light receiving optical axis deflecting unit which are arranged on a same plane, the photodetector is arranged on a plane different from the first light receiving optical axis deflecting unit and the second light receiving optical axis deflecting unit.

20 Claims, 6 Drawing Sheets

(51) Int. Cl.
*G01S 17/08* (2006.01)
*G01S 17/66* (2006.01)

(56) References Cited

U.S. PATENT DOCUMENTS

| | | |
|---|---|---|
| 6,437,859 B1 | 8/2002 | Ohtomo et al. |
| 9,500,518 B2 * | 11/2016 | Cook .................... G01S 17/023 |
| 2004/0027554 A1 | 2/2004 | Ishinabe et al. |
| 2005/0024625 A1 | 2/2005 | Mori et al. |
| 2006/0114448 A1 | 6/2006 | Andersson et al. |
| 2008/0074637 A1 | 3/2008 | Kumagai et al. |
| 2009/0153667 A1 | 6/2009 | Kumagai et al. |
| 2011/0013200 A1 | 1/2011 | Kato |
| 2012/0224164 A1 | 9/2012 | Hayashi et al. |
| 2012/0262700 A1 | 10/2012 | Schumann et al. |
| 2012/0292482 A1 | 11/2012 | Cook et al. |
| 2015/0043009 A1 | 2/2015 | Bridges et al. |

FOREIGN PATENT DOCUMENTS

| | | |
|---|---|---|
| JP | 2001-21354 A | 1/2001 |
| JP | 2004-69611 A | 3/2004 |
| JP | 2005-55226 A | 3/2005 |
| JP | 2005-530174 A | 10/2005 |
| JP | 2008-82782 A | 4/2008 |
| JP | 2012-181113 A | 9/2012 |
| WO | 2009/113484 A1 | 9/2009 |

OTHER PUBLICATIONS

European communication dated May 30, 2017 in corresponding European patent application No. 16203237.9.

\* cited by examiner

ELECTRONIC DISTANCE MEASURING INSTRUMENT

BACKGROUND OF THE INVENTION

The present invention relates to an electronic distance measuring instrument which receives a reflected light from an object to be measured and performs a distance measurement.

A surveying instrument such as a laser scanner or a total station, or the like has an electronic distance measuring instrument which detects a distance to an object to be measured by a prism distance measurement using a reflection prism or by a non-prism distance measurement using no reflection prism.

An optical system used in the electronic distance measuring instrument is required to be capable of performing a sighting at a high magnification and a high resolution. For this reason, an aperture of a lens (or a lens group) constructing the optical system is a large aperture and a long focal length. For this reason, the optical system is large in size and heavy.

The electronic distance measuring instrument has a lens group constructed of plural lenses, and an incident light is arranged to focus on a light receiving surface by a refraction action of the lenses. The lens group has a focal length f, and this focal length is determined by a performance required for the optical system in the electronic distance measuring instrument.

Therefore, a light receiving unit in the electronic distance measuring instrument must have a size adequate to accommodate the lens group, and a length of an optical axis direction is dependent on the focal length f. Further, in recent years, a miniaturization and a weight reduction of the electronic distance measuring instrument are achieved, but regarding the optical system, it is still difficult to miniaturize due to a restriction on a size of the lens group and the focal length f.

SUMMARY OF THE INVENTION

It is an object of the present invention to provide an electronic distance measuring instrument which achieves a miniaturization of an optical system.

To attain the object as described above, an electronic distance measuring instrument according to the present invention comprises a light projecting optical system for emitting a distance measuring light projected from a distance measuring light source onto a distance measuring optical axis and a light receiving optical system for receiving a reflected distance measuring light from an object to be measured and leading to a photodetector, wherein the light projecting optical system is so arranged that a projection optical axis crosses a light receiving optical axis with each other and has a projection optical axis deflecting unit for deflecting the projection optical axis so that the projection optical axis coincides with the light receiving optical axis at an intersecting position of the projection optical axis and the light receiving optical axis, the light receiving optical system has a first light receiving optical axis deflecting unit and a second light receiving optical axis deflecting unit which are arranged on a same plane, the first light receiving optical axis deflecting unit deflects the light receiving optical axis toward the second light receiving optical axis deflecting unit, and the second light receiving optical axis deflecting unit deflects the light receiving optical axis toward the photodetector arranged on a plane different from the first light receiving optical axis deflecting unit and the second light receiving optical axis deflecting unit.

Further, in the electronic distance measuring instrument according to the present invention, the projection optical axis deflecting unit is a beam splitter, an optical path length adjustment component which is a transparent optical component having a hole formed in a central portion thereof is provided on an optical path of a reflected distance measuring light, the hole has a size which allows only a reflected distance measuring light passed through the beam splitter to pass, and a board thickness of the optical path length adjustment component is set so that an optical path length of the reflected distance measuring light which passes through the beam splitter and is extended becomes equal to an optical path length of the reflected distance measuring light which passes through the optical path length adjustment component and is extended.

Further, the electronic distance measuring instrument according to the present invention further comprises a scanning mirror provided on the distance measuring optical axis, wherein the distance measuring light is rotated and projected by the scanning mirror.

Further, in the electronic distance measuring instrument according to the present invention, a window component is provided on an object-to-be-measured side of the scanning mirror, and the window component integrally rotates with the scanning mirror.

Further, the electronic distance measuring instrument according to the present invention further comprises an image pickup unit having an image pickup optical axis and an image pickup optical axis deflecting unit, wherein the image pickup optical axis deflecting unit deflects the image pickup optical axis so that the image pickup optical axis becomes coaxial with the projection optical axis and the light receiving optical axis.

Further, the electronic distance measuring instrument according to the present invention further comprises a laser pointer projecting unit having a laser pointer optical axis and a laser pointer optical axis deflecting unit, wherein the laser pointer optical axis deflecting unit deflects the laser pointer optical axis so that the laser pointer optical axis becomes coaxial with the projection optical axis.

Further, the electronic distance measuring instrument according to the present invention further comprises a tracking light illumination system having a tracking light source for emitting a tracking light and a tracking optical axis deflecting unit for deflecting a tracking optical axis toward the second light receiving optical axis deflecting unit, wherein the second light receiving optical axis deflecting unit serves as a dichroic mirror for allowing only the tracking light to pass through.

Further, the electronic distance measuring instrument according to the present invention further comprises a tracking light illumination system having a tracking optical axis and a tracking optical axis deflecting unit, wherein the tracking optical axis deflecting unit deflects the tracking optical axis so that the tracking optical axis becomes coaxial with the projection optical axis.

Furthermore, in the electronic distance measuring instrument according to the present invention, the image pickup unit is configured to also serve as a light receiving optical system for a tracking light.

According to the present invention, the electronic distance measuring instrument comprises a light projecting optical system for emitting a distance measuring light projected from a distance measuring light source onto a distance measuring optical axis and a light receiving optical system for receiving a reflected distance measuring light from an object to be measured and leading to a photodetector, wherein the light projecting optical system is so arranged that a projection optical axis crosses a light receiving optical axis with each other and has a projection optical axis deflecting unit for deflecting the projection optical axis so that the projection optical axis coincides with the light receiving optical axis at an intersecting position of the projection optical axis and the light receiving optical axis, the light receiving optical system has a first light receiving optical axis deflecting unit and a second light receiving optical axis deflecting unit which are arranged on a same plane, the first light receiving optical axis deflecting unit deflects the light receiving optical axis toward the second light receiving optical axis deflecting unit, and the second light receiving optical axis deflecting unit deflects the light receiving optical axis toward the photodetector arranged on a plane different from the first light receiving optical axis deflecting unit and the second light receiving optical axis deflecting unit. As a result, a length of the light receiving optical system in an optical axis direction can be shorter than a focal length of a lens group in the light receiving optical system, and hence a miniaturization of the light receiving optical system can be achieved.

DETAILED DESCRIPTION OF THE PREFERRED EMBODIMENTS

A description will be given below on embodiments of the present invention by referring to the attached drawings. It is to be noted that, in the following embodiments, in a case where reference is made to being coaxial, a case of being approximately coaxial is included in addition to a case of being coaxial.

Figure 1:
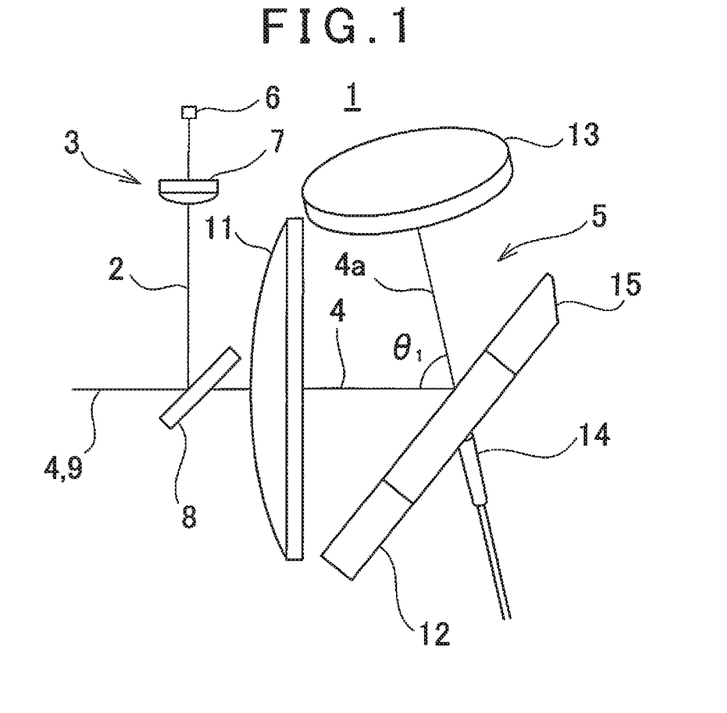
FIG. 1 is a side view showing an optical system in an electronic distance measuring instrument according to a first embodiment of the present invention.
Figure 2A:
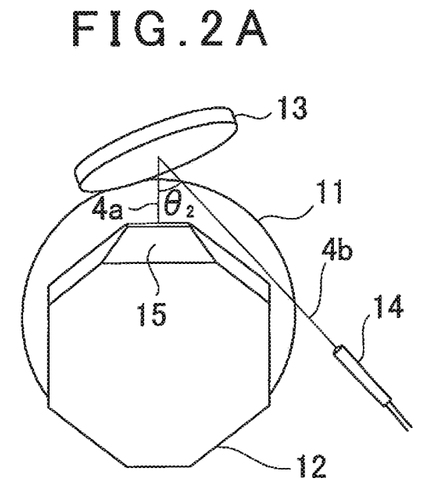
FIG. 2A is a rear view showing an optical system in the electronic distance measuring instrument.
Figure 2B:
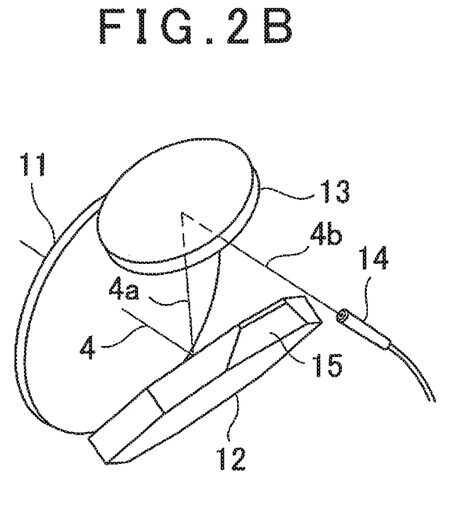
FIG. 2B is a perspective view showing an optical system in the electronic distance measuring instrument.

First, in FIG. 1, FIG. 2A and FIG. 2B, a description will be given on an electronic distance measuring instrument 1 according to a first embodiment of the present invention.

The electronic distance measuring instrument 1 is applied to a surveying instrument, e.g., a laser scanner or a total station, or the like. The electronic distance measuring instrument 1 has a light projecting optical system 3 having a projection optical axis 2 and a light receiving optical system 5 having a light receiving optical axis 4.

A distance measuring light source 6 and a collimator lens 7 are provided on the projection optical axis 2. The projection optical axis 2 and the light receiving optical axis 4 cross each other, and a light projecting deflection mirror 8 which is a projection optical axis deflecting unit is provided at an intersection. Further, the light receiving optical system 5 is provided on the light receiving optical axis 4 passing through the light projecting deflection mirror 8. The light projecting deflection mirror 8 deflects the projection optical axis 2 toward a distance measuring optical axis 9 so that a distance measuring light is projected to an object to be measured (not shown). The distance measuring optical axis 9 coincides with the light receiving optical axis 4.

The distance measuring light source 6 is, e.g., a semiconductor laser or the like, and emits an infrared light which is an invisible light or a laser beam which is a visible light as the distance measuring light on the projection optical axis 2. Further, the distance measuring light source 6 is configured to be controlled by a control unit (not shown) so that a laser beam is emitted in a state as required, e.g., a light intensity as required or a pulse interval as required (a frequency), or the like.

The collimator lens 7 turns the distance measuring light into a parallel luminous flux. Further, the light projecting deflection mirror 8 has a size adequate to reflect the distance measuring light which is turned into the parallel luminous flux.

The light projecting deflection mirror 8, a condenser lens 11, a first deflection mirror 12 which is a first light receiving optical axis deflecting unit, a second deflection mirror 13 which is a second light receiving optical axis deflecting unit, and a photodetector 14 are provided on the light receiving optical axis 4.

The condenser lens 11 is, e.g., an infinite conjugate lens, and is configured to condense a reflected distance measuring light which enters as a parallel luminous flux to the photodetector 14 through the first deflection mirror 12 and the second deflection mirror 13. It is to be noted that, a multiple aspherical lens may be used as the condenser lens 11 so as to increase a light receiving amount at a near distance. Further, the condenser lens 11 may be constructed of plural lenses.

The first deflection mirror 12 has, e.g., an octagonal outer shape, and an upper end corner portion on an opposite side is cut off and a chamfered portion 15 is formed. Further, the first deflection mirror 12 upwardly deflects the light receiving optical axis 4 at θ1, e.g., 60° to 80° in FIG. 1. The second deflection mirror 13 is provided on an optical axis 4a as deflected. The second deflection mirror 13 deflects the optical axis 4a so that the optical axis 4a is within a plane which includes the optical axis 4a and is vertical with respect to a paper surface and θ2 is formed. The photodetector 14 is provided on an optical axis 4b as deflected by the second deflection mirror 13.

The second deflection mirror 13 is configured to deflect the light receiving optical axis 4 at an angle of θ2, e.g., approximately 30° to 60° toward the photodetector 14. Therefore, the condenser lens 11, the first deflection mirror 12 and the second deflection mirror 13 are provided within a same plane. That is to say, the condenser lens 11, the first deflection mirror 12 and the second deflection mirror 13 are arranged so that a center of the condenser lens 11, the first deflection mirror 12 and the second deflection mirror 13 is included within the same plane (a paper surface in FIG. 1). Further, the photodetector 14 is provided at a position apart from the plane.

Here, a focal length of the condenser lens 11 is a length which adds up an optical path length from a position of a principal point of the condenser lens 11 to the first deflection mirror 12, an optical path length from the first deflection mirror 12 to the second deflection mirror 13 and an optical path length from the second deflection mirror 13 to the photodetector 14.

The distance measuring light source 6, the collimator lens 7 and the light projecting deflection mirror 8 compose the light projecting optical system 3. Further, the condenser lens 11, the first deflection mirror 12, the second deflection mirror 13 and the photodetector 14 compose the light receiving optical system 5.

The distance measuring light emitted from the distance measuring light source 6 is turned to the parallel luminous flux by the collimator lens 7 and enters the light projecting deflection mirror 8. The distance measuring light is reflected onto the distance measuring optical axis 9 by the light projecting deflection mirror 8 and is projected to the object to be measured (not shown).

The reflected distance measuring light as reflected by the objected to be measured passes a periphery of the light projecting deflection mirror 8 and enters the condenser lens 11. The reflected distance measuring light as condensed by the condenser lens 11 is reflected by the first deflection mirror 12, is reflected by the second deflection mirror 13 and is focused on the photodetector 14.

When the reflected distance measuring light is received by the photodetector 14, a control unit (not shown) calculates a distance to the object to be measured based on a light receiving signal transmitted from the photodetector 14.

As described above, in the first embodiment, the light receiving optical system 5 has the condenser lens 11, the first deflection mirror 12 and the second deflection mirror 13 which are provided on the same plane, and the photodetector 14 provided on the plane different from the first deflection mirror 12 or the like. That is to say, the respective optical components in the light receiving optical system 5 are three-dimensionally arranged.

In the present embodiment, since the light receiving optical axis 4 is three-dimensionally bent, a length of the light receiving optical system 5 in a direction of the light receiving optical axis 4 (a depth of an accommodating space of the light receiving optical system 5) can be shorter than a length of the focal length of the condenser lens 11, and a miniaturization of the electronic distance measuring instrument 1 can be achieved.

Further, since a corner portion of a reflection side end portion of the first deflection mirror 12 is cut off and the chamfered portion 15 is formed, a length of the light receiving optical system 5 in an optical axis direction can be shorten as much as a cut part of the chamfered portion 15, and a miniaturization of the electronic distance measuring instrument 1 can be achieved.

It is to be noted that a lens which has a characteristic to increase a light receiving amount at a near distance may be added to the light receiving optical system 5. When the lens is added, in a measurement at a near distance, it is possible to prevent an insufficiency of a light receiving amount caused due to an interruption of a reflected distance measuring light by the light projecting deflection mirror 8.

Figure 3:
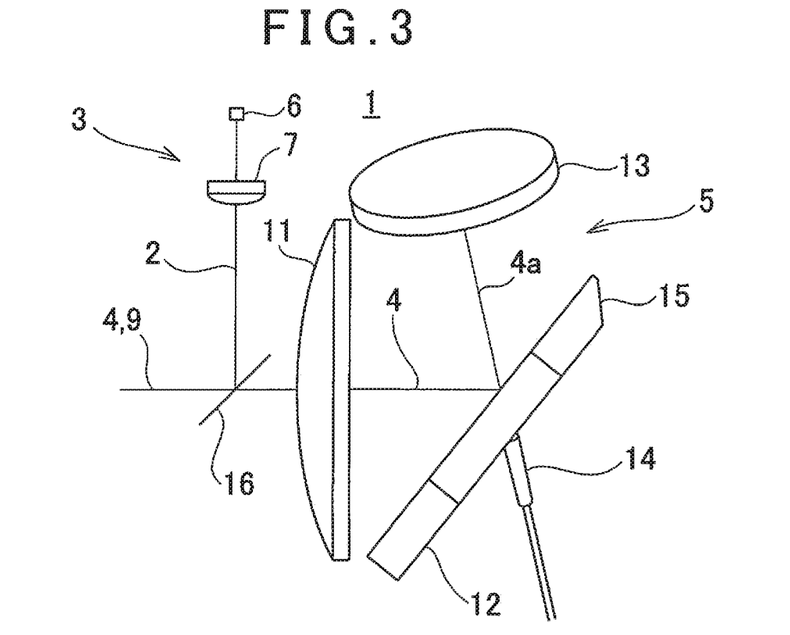
FIG. 3 is a side view showing an optical system in an electronic distance measuring instrument according to a second embodiment of the present invention.

Next, in FIG. 3, a description will be given on a second embodiment of the present invention. It is to be noted that, in FIG. 3, what are equivalent to components as shown in FIG. 1 are referred by the same symbol, and a detailed description thereof will be omitted.

In an electronic distance measuring instrument 1 in the second embodiment, a thin beam splitter 16 which is a projection optical axis deflecting unit, e.g., a pellicle coating beam splitter, or the like is provided at an intersecting position of a projection optical axis 2 and a light receiving optical axis 4. It is to be noted that the beam splitter 16 reflects a part of a distance measuring light, and allows a remaining part to pass through. A reflectivity of the beam splitter 16 is, e.g., approximately 50% to 95%. Further, the beam splitter 16 is a part of a light projecting optical system 3 and also a part of a light receiving optical system 5.

For example, in a case where a non-prism distance measurement is performed, in a case where an object to be measured is present at a position which is beyond a predetermined distance, a reflected distance measuring light is received by the electronic distance measuring instrument 1 as a parallel luminous flux which is a spread luminous flux. In a case where the object to be measured is present at a position which is within the predetermined distance, the reflected distance measuring light is received by the electronic distance measuring instrument 1 as a diffused light which is a spread luminous flux.

Therefore, when the beam splitter 16 is used as a projection optical axis deflecting unit and a part of the reflected distance measuring light is configured to pass through the beam splitter 16, a sufficient light receiving amount of the reflected distance measuring light can be assured, and a stable measurement can be performed.

Further, in a case where the prism distance measurement is performed, especially in the prism distance measurement at a near distance, even under such condition that a reflected light enters as a parallel luminous flux having a small width without sufficiently diffusing and the reflected distance measuring light is blocked by the beam splitter 16, a light amount can be sufficiently assured from the reflected distance measuring light which passes through the beam splitter 16, and a stable measurement can be performed.

Further, since the beam splitter 16 has a small thickness, a difference in optical path length is hardly produced between the reflected distance measuring light passing through the beam splitter 16 and the reflected distance measuring light passing the periphery of the beam splitter 16, and a measurement accuracy is not affected.

Figure 4:
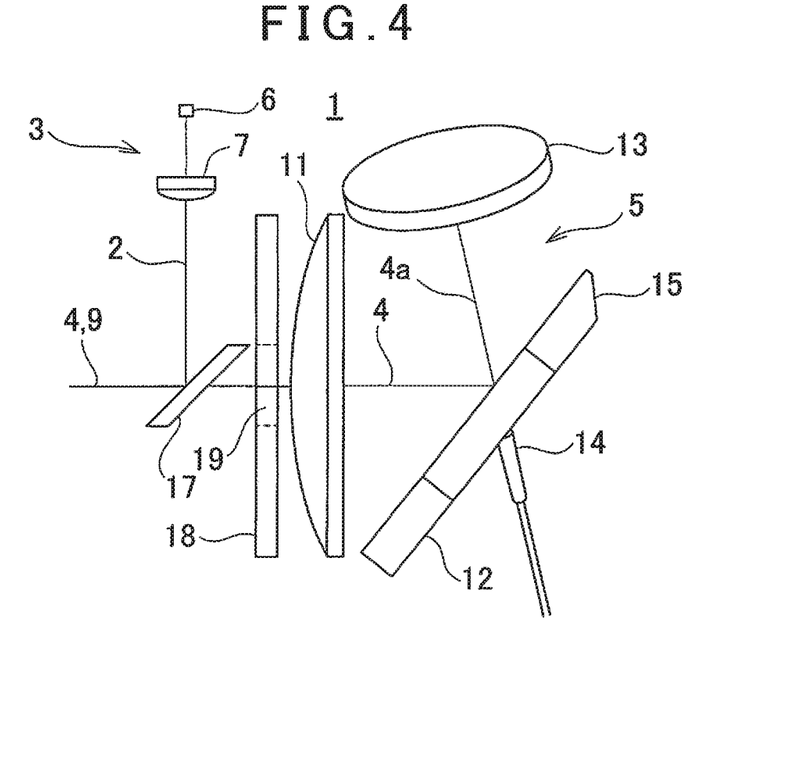
FIG. 4 is a side view showing an optical system in an electronic distance measuring instrument according to a third embodiment of the present invention.

Next, in FIG. 4, a description will be given on a third embodiment of the present invention. It is to be noted that, in FIG. 4, what are equivalent to components as shown in FIG. 1 are referred by the same symbol, and a detailed description thereof will be omitted.

In an electronic distance measuring instrument 1 in the third embodiment, a beam splitter 17 which is a projection optical axis deflecting unit is provided at an intersecting position of a projection optical axis 2 and a light receiving optical axis 4. Further, the beam splitter 17 has a thickness with a certain extent which affects a measurement accuracy.

An optical path length adjustment component 18 is provided between the beam splitter 17 and a condenser lens 11.

The optical path length adjustment component 18 is, e.g., a transparent optical component such as a glass plate, or the like having a hole 19 formed at a central portion thereof, and an antireflection coating (an AR coating) is formed on an entire surface thereof. A diameter of the hole 19 is approximately the same size as a diameter of a projected shape of the beam splitter 17, and is a size which allows only the reflected distance measuring light passing through the beam splitter 17 to pass the hole 19. It is to be noted that a reflectivity and a transmissivity of the beam splitter 17 are the same as a reflectivity and a transmissivity in the second embodiment.

Further, a board thickness of the optical path length adjustment component 18 is a thickness which equalizes an optical path length extended when the reflected distance measuring light passes through the beam splitter 17 with an optical path length extended when the reflected distance measuring light passes through the optical path length adjustment component 18. That is to say, the optical path length adjustment component 18 is configured to correct an optical path length of the reflected distance measuring light which does not pass through the beam splitter 17.

It is to be noted that, in the third embodiment, the beam splitter 17 is a part of a light projecting optical system 3 and a light receiving optical system 5. Further, the optical path length adjustment component 18 is a part of the light receiving optical system 5.

Regarding a case of a far-distance measurement, a part of the reflected distance measuring light diffused and reflected by an object to be measured passes through the beam splitter 17 and then passes the hole 19. Further, a remaining part of the reflected distance measuring light passes a periphery of the beam splitter 17 and then passes through the optical path length adjustment component 18.

In the third embodiment, since the optical path length adjustment component 18 having the hole 19 formed at the central portion is provided on the light receiving optical axis 4 and an optical path length of the reflected distance measuring light passing a periphery without entering the beam splitter 17 is corrected by the optical path length adjustment component 18, the optical path length of the reflected distance measuring light passed through the beam splitter 17 can be made equal to the optical path length of the reflected distance measuring light having passed the periphery of the beam splitter 17.

Therefore, it is possible to prevent an error from being produced in a measurement result due to a difference in optical path length between the reflected distance measuring light passed through the beam splitter 17 and the reflected distance measuring light having passed the periphery of the beam splitter 17, and a measurement accuracy can be improved.

Further, regarding a case of a prism distance measurement at a near distance, a spread of a luminous flux of the reflected distance measuring light is small, and a reflected luminous flux passes through the beam splitter 17, passes the hole 19 and is received by a photodetector 14.

Figure 5:
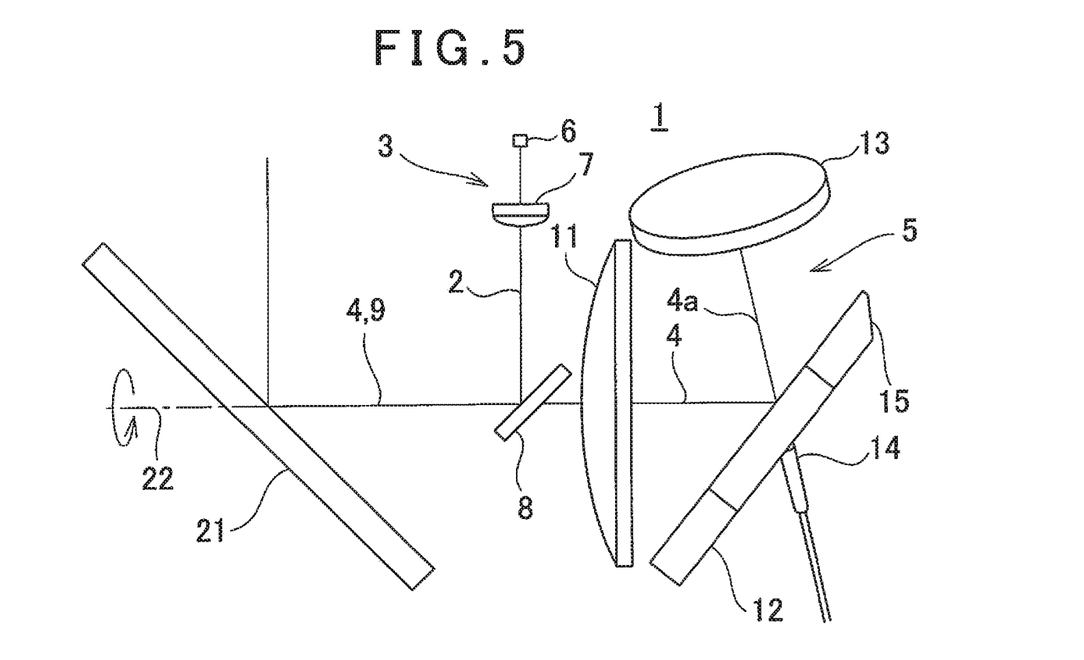
FIG. 5 is a side view showing an optical system in an electronic distance measuring instrument according to a fourth embodiment of the present invention.

Next, in FIG. 5, a description will be given on a fourth embodiment of the present invention. It is to be noted that, in FIG. 5, what are equivalent to components as shown in FIG. 1 are referred by the same symbol, and a detailed description thereof will be omitted.

In an electronic distance measuring instrument 1 in the fourth embodiment, a scanning mirror 21 is provided on a distance measuring optical axis 9 of an electronic distance measuring instrument 1 in a first embodiment. The scanning mirror 21 can rotate with a rotation shaft 22 as the center in a vertical direction, and is controlled by a control unit (not shown) so that the scanning mirror 21 rotates at a predetermined angle. Or the scanning mirror 21 is controlled by the control unit so that the scanning mirror 21 rotates at a predetermined rotation speed. The electronic distance measuring instrument 1 and the rotation shaft 22 can integrally rotate in a horizontal direction at a constant speed.

Further, the scanning mirror 21, e.g., deflects the distance measuring optical axis 9 at a right angle and projects a distance measuring light to an outside of the electronic distance measuring instrument 1. The distance measuring light scans an object to be measured (not shown) by a rotation of the scanning mirror 21. The distance measuring light as reflected by the object to be measured is configured to enter the scanning mirror 21 as a reflected distance measuring light and to be reflected onto a light receiving optical axis 4 by the scanning mirror 21.

Since the scanning mirror 21 is provided, the object to be measured can be scanned, and point cloud data of the object to be measured can be acquired.

Figure 6:
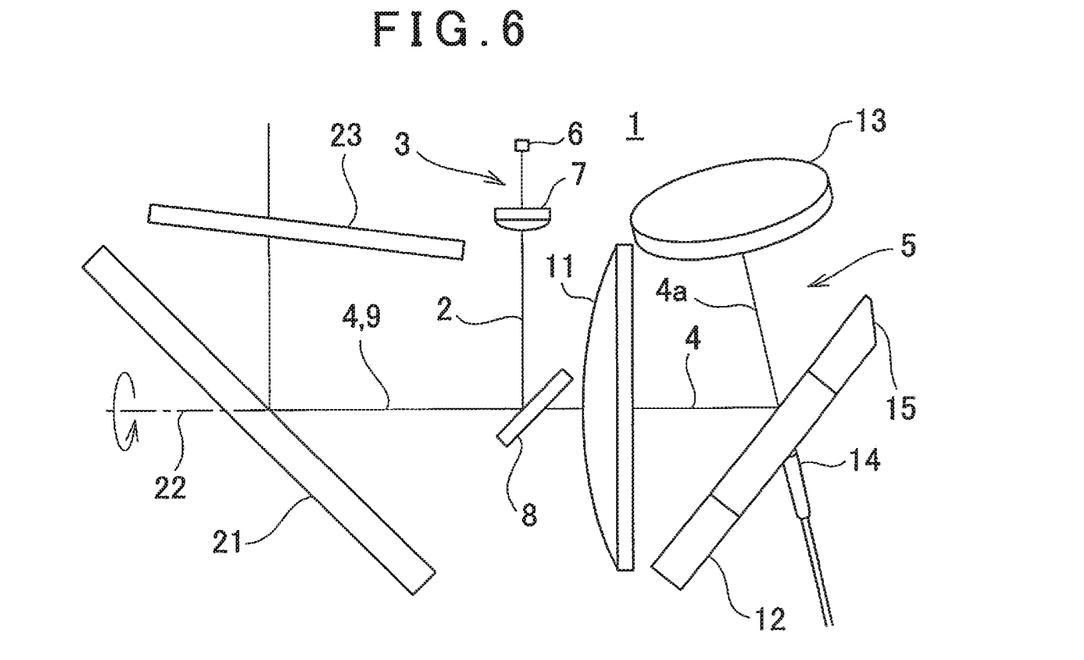
FIG. 6 is a side view showing a modification of an optical system in the electronic distance measuring instrument.

FIG. 6 shows a modification of the fourth embodiment. In the modification, a window component 23 is provided on an object-to-be-measured side of the scanning mirror 21. The window component 23 is, e.g., a glass plate, and provided at tilted position with respect to the distance measuring optical axis 9 deflected by the scanning mirror 21. By tilting the window component 23, it is possible to eliminate an influence of the reflected light on the window component 23.

Further, the window component 23 has a size which allows a distance measuring light reflected by the scanning mirror 21 and a reflected distance measuring light entering the scanning mirror 21 to pass through, and is configured to integrally rotate with the scanning mirror 21.

Next, in FIG. 7 and FIG. 8, a description will be given on a fifth embodiment of the present invention. It is to be noted that, in FIG. 7, what are equivalent to components as shown in FIG. 6 are referred by the same symbol, and a detailed description thereof will be omitted.

An electronic distance measuring instrument 1 in the fifth embodiment has a configuration provided by adding an image pickup unit 24 to a modification of a fourth embodiment shown in FIG. 6.

The image pickup unit 24 is composed of a photodetector 26 such as a CCD or a CMOS sensor, or the like, a camera lens group 27 and a dichroic mirror 28 which are provided on an image pickup optical axis 25. The dichroic mirror 28 is provided on a projection optical axis 2, and a reflection optical axis of the dichroic mirror 28 is the projection optical axis 2. Further, a transmission optical axis of the dichroic mirror 28 is the image pickup optical axis 25. The projection optical axis 2 is deflected by the dichroic mirror 28, further deflected by a light projecting deflection mirror 8 and coincides with a distance measuring optical axis 9. It is to be noted that the projection optical axis 2 and the image pickup optical axis 25 are arranged so as to be included in a plane vertical with respect to the distance measuring optical axis 9.

The dichroic mirror 28 has an optical characteristic of reflecting a distance measuring light and allowing a light having a wavelength other than a wavelength of a distance measuring light, e.g., a background light, or the like to pass through, and reflects the distance measuring light toward the light projecting deflection mirror 8. Further, it is so arranged that the distance measuring light emitted from a distance measuring light source 6 enters the dichroic mirror 28. It is to be noted that the light projecting deflection mirror 8 and the dichroic mirror 28 compose a projection optical axis deflecting unit. Further, by the light projecting deflection mirror 8, an image pickup optical axis deflecting unit is composed.

The distance measuring light is reflected toward the light projecting deflection mirror 8 by the dichroic mirror 28. Further, the distance measuring light is reflected by the light projecting deflection mirror 8 and the scanning mirror 21, and projected to an object to be measured (not shown).

A reflected distance measuring light and a background light from the object to be measured enter the scanning mirror 21 along the distance measuring optical axis 9, and are deflected onto a light receiving optical axis 4 by the scanning mirror 21.

In one of the reflected distance measuring light, the reflected distance measuring light which passed a periphery of the light projecting deflection mirror 8 is condensed by a condenser lens 11, is reflected by a first deflection mirror 12, is reflected by a second deflection mirror 13 and is received by a photodetector 14. Based on a light receiving signal from the photodetector 14, a distance to the object to be measured is measured.

Further, in one of background light, the background light reflected by the light projecting deflection mirror 8 passes through the dichroic mirror 28, and is received by the photodetector 26 through the camera lens group 27. Based on the light receiving signal from the photodetector 26, an image of the object to be measured is acquired.

In the fifth embodiment, it is so arranged that the distance measuring light is reflected by the dichroic mirror 28, and then is deflected onto the distance measuring optical axis 9 by the light projecting deflection mirror 8. That is to say, the dichroic mirror 28 deflects the image pickup optical axis 25 so that the image pickup optical axis 25 becomes coaxial or approximately coaxial with the projection optical axis 2 and the light receiving optical axis 4. Further, since the image pickup unit 24 is arranged in an accommodating space of the light receiving optical system 5, an optical system can be miniaturized, and a miniaturization of the electronic distance measuring instrument 1 can be achieved.

Next, in FIG. 9, a description will be given on a sixth embodiment of the present invention. It is to be noted that in FIG. 9, what are equivalent to components as shown in FIG. 8 are referred by the same symbol, and a detailed description thereof will be omitted.

Figure 8:
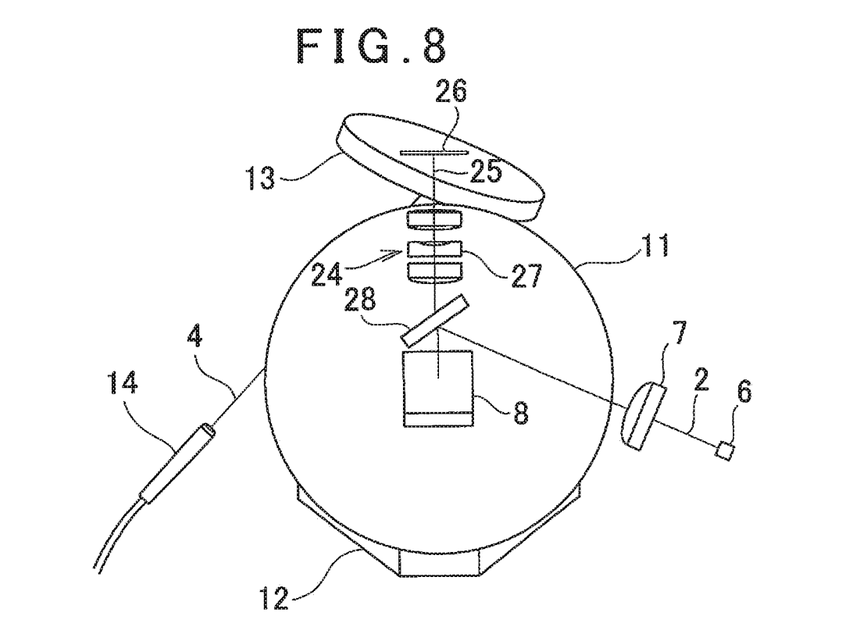
FIG. 8 is a front view showing an optical system in the electronic distance measuring instrument.

An electronic distance measuring instrument 1 in the sixth embodiment has a configuration provided by adding a laser pointer projecting unit 29 to a fifth embodiment shown in FIG. 8.

The laser pointer projecting unit 29 is composed of a laser pointer light source 32 provided on a laser pointer optical axis 31, a laser pointer projection lens 33 and a dichroic mirror 34 which is a laser pointer optical axis deflecting unit. The dichroic mirror 34 is provided on a projection optical axis 2, and a branched optical axis of the dichroic mirror 34 is the laser pointer optical axis 31.

The laser pointer light source 32 can emit a laser pointer light which is a visible light. The dichroic mirror 34 has an optical characteristic of reflecting only the laser pointer light and allowing a distance measuring light to pass through, and is configured to deflect the laser pointer optical axis 31 toward the projection optical axis 2. Further, a dichroic mirror 35 provided on an image pickup optical axis 25 has an optical characteristic of totally reflecting a distance measuring light, and partially allowing the laser pointer light and a background light to pass through and partially reflecting the laser pointer light and a background light, or preferably, totally allowing the background light to pass through.

A projecting position of the laser pointer light can be confirmed by an image acquired by the image pickup unit 24, and a position of a measuring point can be easily confirmed.

In the sixth embodiment, the laser pointer optical axis 31 is deflected toward the projection optical axis 2 by the dichroic mirror 34. That is to say, since the dichroic mirror 34 deflects the laser pointer optical axis 31 so that the laser pointer optical axis 31 becomes coaxial or approximately coaxial with the projection optical axis 2, an optical system can be miniaturized, and a miniaturization of the electronic distance measuring instrument 1 can be achieved.

Figure 10A:
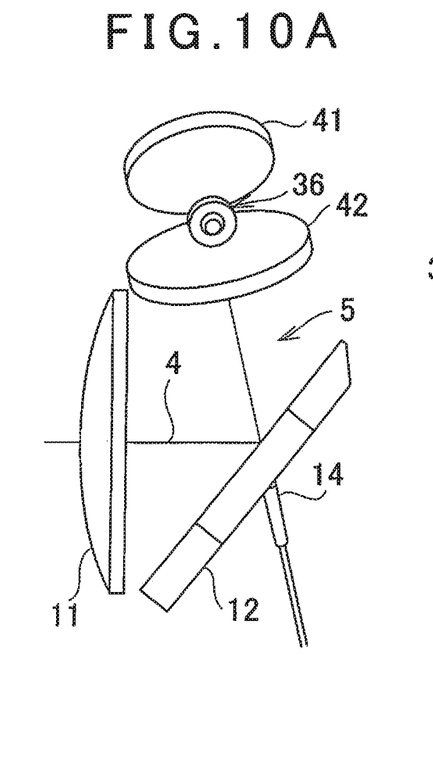
FIG. 10A is a side view showing an optical system in an electronic distance measuring instrument according to a seventh embodiment of the present invention.
Figure 10B:
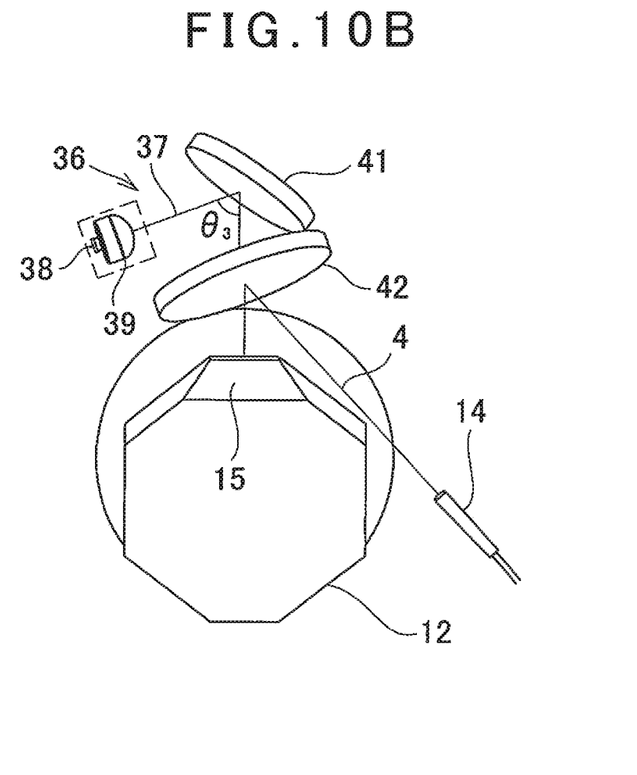
FIG. 10B is a rear view showing an optical system in the electronic distance measuring instrument.

Next, in FIG. 10A and FIG. 10B, a description will be given on a seventh embodiment of the present invention. It is to be noted that, in FIG. 10A and FIG. 10B, what are equivalent to components as shown in FIG. 7 and FIG. 8 are referred by the same symbol, and a detailed description thereof will be omitted.

Figure 7:
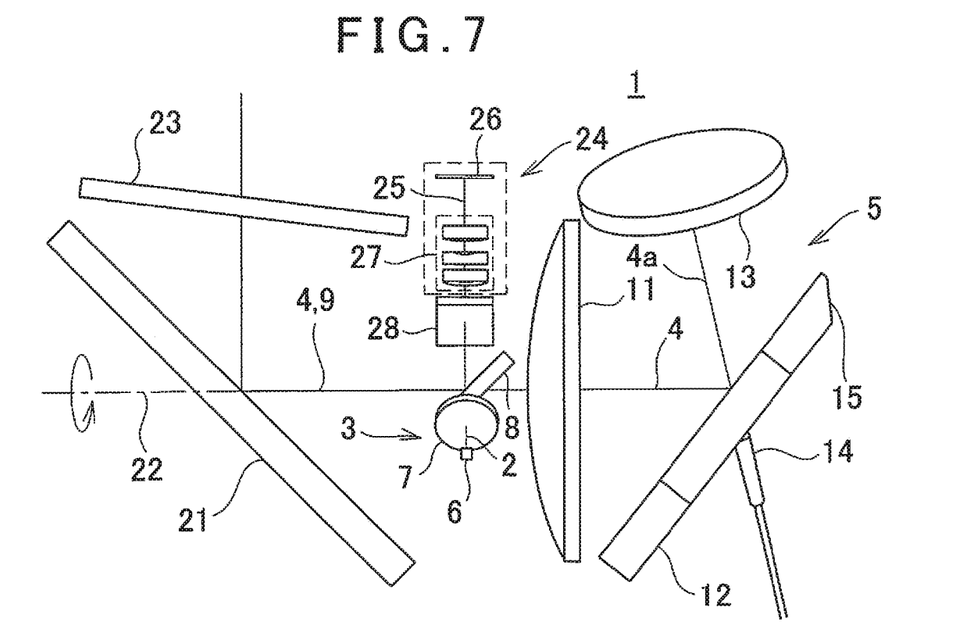
FIG. 7 is a side view showing an optical system in an electronic distance measuring instrument according to a fifth embodiment of the present invention.

An electronic distance measuring instrument 1 in the seventh embodiment has a configuration provided by adding a tracking light illumination system 36 to the fifth embodiment shown in FIG. 7 and FIG. 8.

The tracking light illumination system 36 is composed of a tracking light source 38 provided on a tracking optical axis 37, a tracking light illumination lens 39, and a tracking light deflection mirror 41 which is a tracking optical axis deflecting unit.

The tracking light deflection mirror 41 reflects a tracking light which is a visible light emitted from the tracking light source 38. The tracking light deflection mirror 41 is arranged to deflect the tracking optical axis 37 at an angle of θ3, e.g., approximately 50° to 80° so that the tracking optical axis 37 becomes coaxial or approximately coaxial with a light receiving optical axis 4.

Further, a dichroic mirror 42 is provided on the tracking optical axis 37. The dichroic mirror 42 has an optical characteristic of allowing only the tracking light to pass through and reflecting a light (a distance measuring light) having a wavelength other than a wavelength of the tracking light. Further, similarly to the second deflection mirror 13 in the fifth embodiment, the dichroic mirror 42 reflects a reflected distance measuring light and allows the reflected distance measuring light to enter a photodetector 14. Further, a light projecting deflection mirror 8 (see FIG. 7) has an optical characteristic of totally reflecting the distance measuring light, and partially allowing the tracking light and a background light to pass through and partially reflecting the tracking light and a background light, or preferably, totally allowing the background light to pass through.

The tracking light emitted from the tracking light source 38 is reflected by the tracking light deflection mirror 41, and passes through the dichroic mirror 42. Further, the tracking light is reflected by a first deflection mirror 12, passes through the light projecting deflection mirror 8, is reflected by a scanning mirror 21 (see FIG. 7) and is projected to an outside of the electronic distance measuring instrument 1.

The tracking light reflected by an object to be measured or the like is reflected by the scanning mirror 21, is reflected by the light projecting deflection mirror 8, passes through a dichroic mirror 28 (see FIG. 7) and is received by an image pickup unit 24 (see FIG. 7).

Therefore, the image pickup unit 24 receives a reflected tracking light as well as the background light, an image is acquired by the image pickup unit 24, and the tracking light is also detected. That is to say, since the image pickup unit 24 also serves as a light receiving optical system for the tracking light, the light receiving optical system for the tracking light does not have to be additionally provided, and a miniaturization of the electronic distance measuring instrument 1 can be achieved.

In the seventh embodiment, the tracking optical axis 37 is deflected to a light receiving optical axis 4 by the tracking light deflection mirror 41. That is to say, the tracking optical axis 37 is deflected by the tracking light deflection mirror 41 so that the tracking optical axis 37 becomes coaxial or approximately coaxial with the light receiving optical axis 4. Therefore, an optical system can be miniaturized, and a miniaturization of the electronic distance measuring instrument 1 can be achieved.

Figure 11:
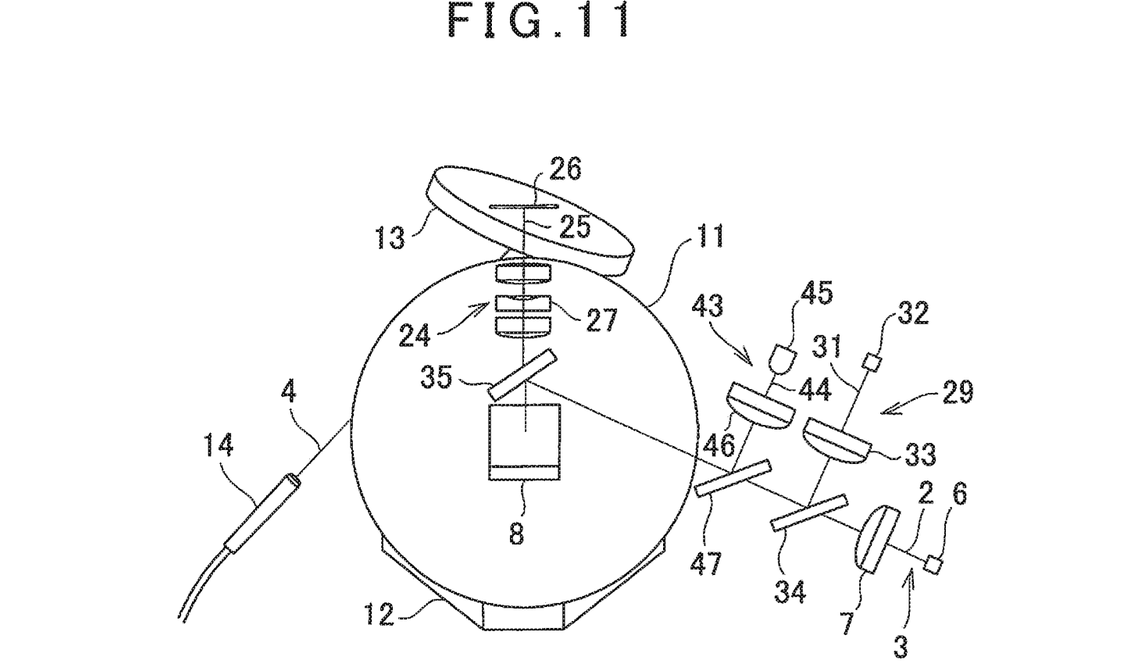
FIG. 11 is a front view showing an optical system in an electronic distance measuring instrument according to an eighth embodiment of the present invention.

Next, in FIG. 11, a description will be given on an eighth embodiment of the present invention. It is to be noted that, in FIG. 11, what are equivalent to components as shown in FIG. 9 are referred by the same symbol, and a detailed description thereof will be omitted.

Figure 9:
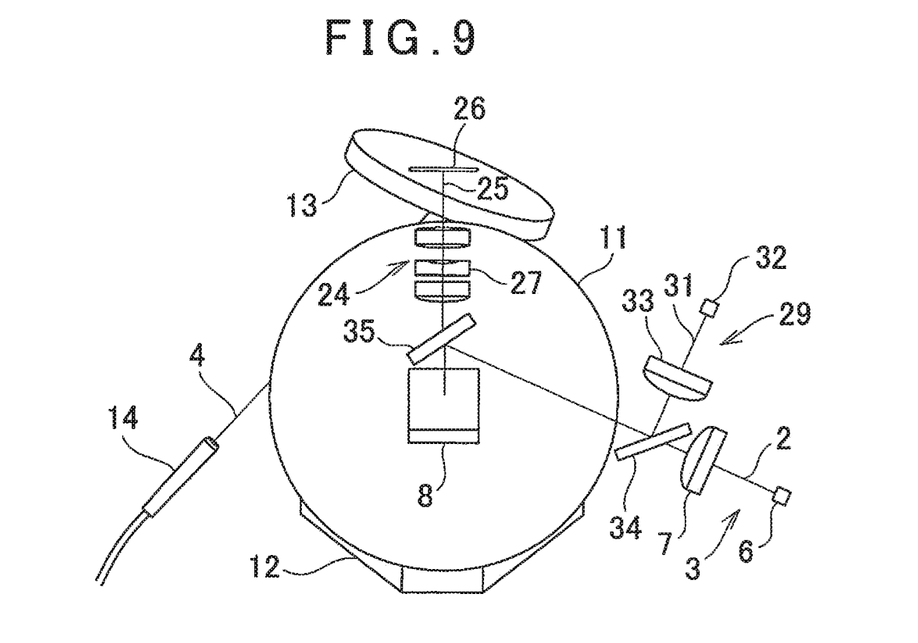
FIG. 9 is a front view showing an optical system in an electronic distance measuring instrument according to a sixth embodiment of the present invention.

An electronic distance measuring instrument 1 in the eighth embodiment has a configuration provided by adding a tracking light illumination system 43 to the sixth embodiment shown in FIG. 9.

The tracking light illumination system 43 is composed of a tracking light source 45 provided on a tracking optical axis 44, a tracking light illumination lens 46 and a dichroic mirror 47 which is a tracking optical axis deflecting unit. The tracking light illumination system 43 is provided on an object-to-be-measured side of a laser pointer projecting unit 29. The dichroic mirror 47 is provided on a projection optical axis 2, and a branched optical axis of the dichroic mirror 47 serves as the tracking optical axis 44.

The tracking light source 45 can emit a tracking light which is a visible light. Further, the dichroic mirror 47 has an optical characteristic of reflecting only the tracking light and allowing a distance measuring light, a laser pointer light, or the like to pass through, and is configured to deflect the tracking optical axis 44 to the projection optical axis 2.

The tracking light emitted from the tracking light source 45 is reflected by the dichroic mirror 47, is reflected by a dichroic mirror 35, is reflected by a light projecting deflection mirror 8, is reflected by a scanning mirror 21 (see FIG. 7) and projected to an outside of the electronic distance measuring instrument 1. The dichroic mirror 35 has an optical characteristic of totally reflecting the distance measuring light, partially allowing a visible light, e.g., the laser pointer light or the tracking light, or the like to pass through, and partially reflecting the visible light, e.g., the laser pointer light or the tracking light, or the like.

The tracking light reflected by an object to be measured or the like is reflected by the scanning mirror 21, is reflected by the light projecting deflection mirror 8, passes through the dichroic mirror 35, and is received by an image pickup unit 24.

Therefore, the image pickup unit 24 receives a reflected tracking light as well as a background light, an image is acquired by the image pickup unit 24, and the tracking light is also detected. That is to say, since the image pickup unit 24 also serves as a light receiving optical system for the tracking light, the light receiving optical system for the tracking light does not have to be additionally provided, and a miniaturization of the electronic distance measuring instrument 1 can be achieved.

Further, since the image pickup unit 24 also receives the laser pointer light, the laser pointer light can be confirmed from the image, and a position of a measuring point can be easily confirmed. It is to be noted that the tracking light and the laser pointer light may be independently blinked. The tracking light and the laser pointer light are put out, a background image using only the background light is acquired, then an image provided by projecting the tracking light and an image provided by projecting the laser pointer light is acquired, and the background image is subtracted from both the images. Consequently, the image using only the tracking light and the image using only the laser pointer light can be acquired, respectively.

In the eighth embodiment, the tracking optical axis 44 is deflected to the projection optical axis 2 by the dichroic mirror 47. That is to say, since the tracking optical axis 44 is deflected by the dichroic mirror 47 so that the tracking optical axis 44 becomes coaxial or approximately coaxial with the projection optical axis 2, an optical system can be miniaturized, and a miniaturization of the electronic distance measuring instrument 1 can be achieved.

The invention claimed is:

1. An electronic distance measuring instrument comprising; a light projecting optical system for emitting a distance measuring light projected from a distance measuring light source along a distance measuring optical axis and a light receiving optical system for receiving a reflected distance measuring light from an object to be measured and leading to a photodetector, wherein said light projecting optical system has a projection optical axis deflecting unit for deflecting said distance measuring light toward said object to be measured, said light receiving optical system has a condenser lens, a first light receiving optical axis deflecting unit, and a second light receiving optical axis deflecting unit which are positioned between said condenser lens and said photodetector and are arranged on a same plane, said first light receiving optical axis deflecting unit deflects a light receiving optical axis toward said second light receiving optical axis deflecting unit such that an angle between an incident optical axis and a reflection optical axis is between 60° and 80°, and said second light receiving optical axis deflecting unit deflects said light receiving optical axis toward said photodetector arranged on a plane different from said first light receiving optical axis deflecting unit and said second light receiving optical axis deflecting unit such that an angle between an incident optical axis and a reflection optical axis is between 30° and 60°, and a plane including the incident optical axis and the reflection optical axis regarding said second light receiving optical axis deflecting unit is perpendicular to a plane including the incident optical axis and the reflection optical axis regarding said first light receiving optical axis deflecting unit.

2. The electronic distance measuring instrument according to claim 1, wherein said projection optical axis deflecting unit is a beam splitter, an optical path length adjustment component which is a transparent optical component having a hole formed in a central portion thereof is provided on an optical path of a reflected distance measuring light, said hole has a size which allows only a reflected distance measuring light passed through said beam splitter to pass, and a thickness of said optical path length adjustment component is set so that an optical path length of the reflected distance measuring light which passes through said beam splitter becomes equal to an optical path length of the reflected distance measuring light which passes through said optical path length adjustment component.

3. The electronic distance measuring instrument according to claim 1 or 2, further comprising a scanning mirror provided on said distance measuring optical axis, wherein said distance measuring light is rotated and projected by said scanning mirror.

4. The electronic distance measuring instrument according to claim 3, wherein a window component is provided on an object-to-be-measured side of said scanning mirror, and said window component integrally rotates with said scanning mirror.

5. The electronic distance measuring instrument according to claim 1 or 2, further comprising an image pickup unit having an image pickup optical axis and an image pickup optical axis deflecting unit, wherein said image pickup optical axis deflecting unit deflects said image pickup optical axis so that said image pickup optical axis becomes coaxial with a projection optical axis and said light receiving optical axis.

6. The electronic distance measuring instrument according to claim 3, further comprising an image pickup unit having an image pickup optical axis and an image pickup optical axis deflecting unit, wherein said image pickup optical axis deflecting unit deflects said image pickup optical axis so that said image pickup optical axis becomes coaxial with a projection optical axis and said light receiving optical axis.

7. The electronic distance measuring instrument according to claim 5, further comprising a laser pointer projecting unit having a laser pointer optical axis and a laser pointer optical axis deflecting unit, wherein said laser pointer optical axis deflecting unit deflects said laser pointer optical axis so that said laser pointer optical axis becomes coaxial with said projection optical axis.

8. The electronic distance measuring instrument according to claim 5, further comprising a tracking light illumination system having a tracking light source for emitting a tracking light and a tracking optical axis deflecting unit for deflecting a tracking optical axis toward said second light receiving optical axis deflecting unit, wherein said second light receiving optical axis deflecting unit serves as a dichroic mirror for allowing only the tracking light to pass through.

9. The electronic distance measuring instrument according to claim 6, further comprising a tracking light illumination system having a tracking light source for emitting a tracking light and a tracking optical axis deflecting unit for deflecting a tracking optical axis toward said second light receiving optical axis deflecting unit, wherein said second light receiving optical axis deflecting unit serves as a dichroic mirror for allowing only the tracking light to pass through.

10. The electronic distance measuring instrument according to claim 5, further comprising a tracking light illumination system having a tracking optical axis and a tracking optical axis deflecting unit, wherein said tracking optical axis deflecting unit deflects said tracking optical axis so that said tracking optical axis becomes coaxial with said projection optical axis.

11. The electronic distance measuring instrument according to claim 6, further comprising a tracking light illumination system having a tracking optical axis and a tracking optical axis deflecting unit, wherein said tracking optical axis deflecting unit deflects said tracking optical axis so that said tracking optical axis becomes coaxial with said projection optical axis.

12. The electronic distance measuring instrument according to claim 8, wherein said image pickup unit is configured to also serve as a light receiving optical system for a tracking light.

13. The electronic distance measuring instrument according to claim 9, wherein said image pickup unit is configured to also serve as a light receiving optical system for a tracking light.

14. The electronic distance measuring instrument according to claim 11, wherein said image pickup unit is configured to also serve as a light receiving optical system for a tracking light.

15. The electronic distance measuring instrument according to claim 4, further comprising an image pickup unit having an image pickup optical axis and an image pickup optical axis deflecting unit, wherein said image pickup optical axis deflecting unit deflects said image pickup optical axis so that said image pickup optical axis becomes coaxial with a projection optical axis and said light receiving optical axis.

16. The electronic distance measuring instrument according to claim 7, further comprising a tracking light illumination system having a tracking light source for emitting a tracking light and a tracking optical axis deflecting unit for deflecting a tracking optical axis toward said second light receiving optical axis deflecting unit, wherein said second light receiving optical axis deflecting unit serves as a dichroic mirror for allowing only the tracking light to pass through.

17. The electronic distance measuring instrument according to claim 7 further comprising a tracking light illumination system having a tracking optical axis and a tracking optical axis deflecting unit, wherein said tracking optical axis deflecting unit deflects said tracking optical axis so that said tracking optical axis becomes coaxial with said projection optical axis.

18. The electronic distance measuring instrument according to claim 10, wherein said image pickup unit is configured to also serve as a light receiving optical system for a tracking light.

19. The electronic distance measuring instrument according to claim 16, wherein said image pickup unit is configured to also serve as a light receiving optical system for a tracking light.

20. The electronic distance measuring instrument according to claim 17, wherein said image pickup unit is configured to also serve as a light receiving optical system for a tracking light.

* * * * *